Patented Feb. 20, 1951

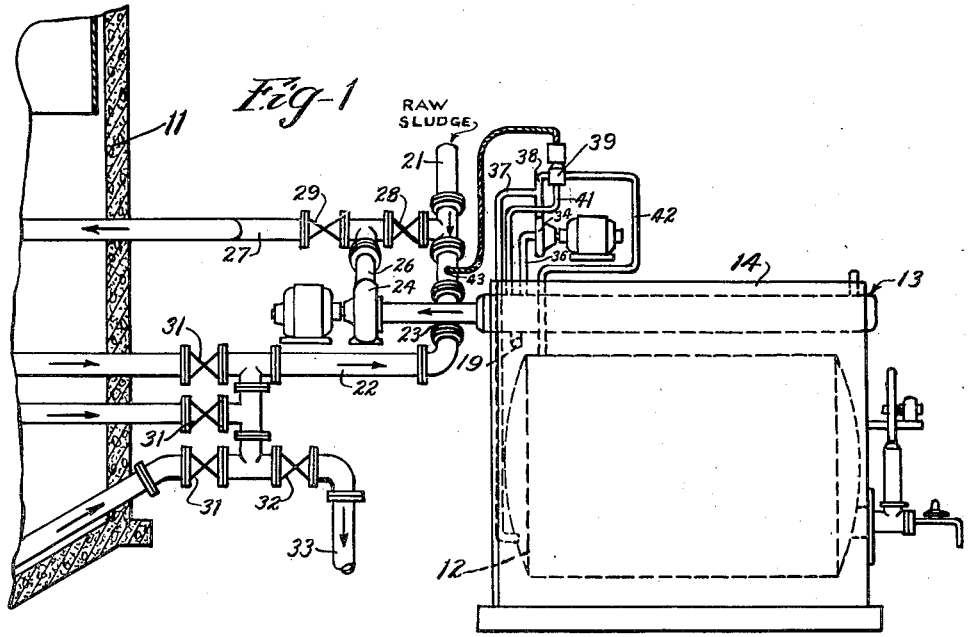
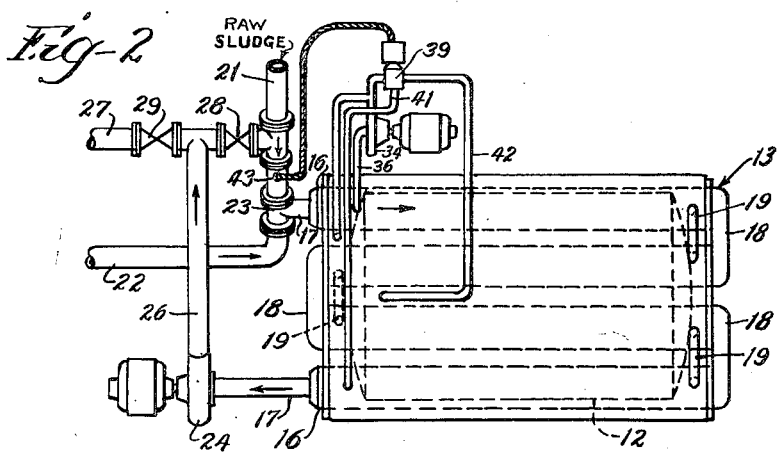

2,542,602

UNITED STATES PATENT OFFICE 2,542,602

APPARATUS FOR HEATING SLUDGE

James Donald Walker, Aurora, Ill., assignor to Walker Process Equipment, Inc., Aurora, Ill., a corporation of Illinois Application February 7, 1948, Serial No. 6,969

5 Claims. (Cl. 257—2)

It has long been recognized that in sewage treating plants the action of the digesters is improved by heating the digester sludge to a temperature in the vicinity of 100° F. The most efficient way to heat such sludge has been to recirculate the sludge through a heat exchanger, passing any raw sludge through the heat exchanger also. The varying conditions have, however, resulted in rather erratic temperature control.

According to the present invention the sludge is recirculated, together with any raw sludge, through a heat exchanger and the supply of heat to the heat exchanger is controlled by the temperature of sludge supplied to the heat exchanger. Because of varying viscosity of the sludge, the flow rate of the sludge through the heat exchanger is not uniform. Accordingly, the supply of heat in exact proportion to the heat requirements of the total volume of sludge passing through the heat exchanger may not be practicable. The present invention nevertheless produces an accommodation to the shock impulses of large quantities of raw sludge by controlling the heat input in response to a mixture of the raw sludge and some heated sludge recirculated directly from the outlet from the heat exchanger without passing through the digester. This direct recirculation of sludge is also advantageous in maintaining a rapid movement of the sludge through the heat exchanger so as to substantially eliminate caking of the sludge within the heat exchanger.

Additional objects and advantages of the invention will be apparent from the following description and from the drawings, in which:

Figure 1 is a somewhat diagrammatic fragmentary side view, partly in section, of the apparatus chosen for illustration of this invention.

Fig. 2 is a fragmentary plan view of part of the apparatus seen in Fig. 1, also partly diagrammatic.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The apparatus of this invention has been shown in conjunction with a sludge digester 11 and a boiler 12, neither of which when considered alone comprises a part of the present invention. The boiler 12 may be heated in any manner, preferably having a burner adapted to use either oil or gas and being automatically controlled to maintain water in the boiler at a predetermined temperature.

An important part of the apparatus of the present invention is the heat exchanger indicated generally by 13. In the illustrated form of the invention this heat exchanger has been mounted within a housing 14 which neatly covers both the boiler 12 and the heat exchanger 13 and which furnishes some joint insulation for both of them. The heat exchanger 13 may be located entirely outside of the boiler housing 14 and the boiler and heat exchanger may be separately insulated. The heat exchanger includes a jacket 16 surrounding an inner pipe 17. Hot water from the boiler 12 is supplied to the space between the jacket 16 and the pipe 17. Sludge to be heated is passed through the pipe or conduit 17. Both the sludge-heating conduit 17 and the jacket 16 comprise a plurality of sections. The successive sections of the conduit 17 are connected by return bends 18 and the successive sections of the jacket are connected by pipes 19. The return bends 18 are of course removable and their removal gives access to the sludge-heating conduit 17 for cleaning, although cleaning is rarely necessary with proper practice of the present invention.

Raw sludge is received by the apparatus of this invention through raw sludge supply conduit 21. Sludge is drawn from the digester 11 through return supply conduit 22. Through fitting 23 these conduits communicate with the intake end of the heat exchanger. The output or hot end of the heat exchanger communicates with a sludge pump 24, the outlet of which communicates with discharge conduits 26 and 27. The discharge conduit 26 is also connected to the raw sludge supply conduit 21 through a recirculation conduit which, in the illustrated form, comprises mainly valve 28. The normal ratio of pumped sludge which is immediately recirculated as compared to that discharged through discharge pipe 27 is controlled by manual regulation of valves 28 and 29. Likewise, valves 31 may be adjusted to control the portions of the digester 11 from which sludge is drawn. Valve 32 may be opened when it is desired to withdraw sludge permanently from the digester through pipe 33.

Hot water is preferably circulated through the jacket 16 by a pump 34. The inlet of the pump 34 may be connected by a pipe 36 to the cold end of the jacket, namely the end at which the sludge enters. The outlet of the pump 34 is connected by a pipe 37 to the lower portion of boiler 12 to return the cooled water to the boiler for heating. The outlet of pump 34 is also connected by a pipe 38 to one inlet of blending valve 39. The other inlet of blending valve 39 is connected by a pipe 42 to the upper portion of boiler 12 to receive heated water therefrom. The outlet of blending valve 39 is connected by a pipe 41 to the hot end of the jacket 16. The blending valve regulates the proportion of hot water from pipe 42 and cooled water from pipe 38 which is delivered to pipe 41, thereby regulating the temperature of the water delivered to the heat exchanger.

The blending valve 39 is controlled by a thermostatic unit 43 which is preferably located approximately as shown. If there were no raw sludge being supplied, the thermostat 43 would be responsive to the temperature of recirculated sludge passing through valve 28. In that event the blending valve would control the output temperature of the sludge fairly accurately. It has been found, however, that when the control of heat is responsive to the temperature of the heated sludge only, there are wide variations in the temperature of the heated sludge due primarily to the fact that when a shock load of raw sludge is supplied no additional heat will be called for until this raw sludge has passed through the heat exchanger to the position of the thermostatic device. Hence the raw sludge which has thus passed through the heater is inadequately heated and enters the digester at an undesirably low temperature.

According to the present invention the heat control is made responsive to the temperature of sludge about to be supplied to the heat exchanger. The rate of supply of the sludge, the rate of its circulation through the heat exchanger, varies considerably with the consistency of the sludge. Hence it often is not practicable to make the heat supply directly proportional to the heat deficiency of the entering sludge. The location shown for the thermostatic device 43 has been found to be a very satisfactory position in that it is responsive both to the temperature of the heated sludge and to the temperature of shock loads of raw sludge. When a shock load of raw sludge is supplied through conduit 21, the thermostatic device 43 immediately controls blending valve 39 to connect pipe 42 solely or primarily to pipe 41 so that more heat is supplied to the jacket 16 than would otherwise have been the case.

Although the controls for blending valve 39 may take many forms, one suitable form is the combination of Minneapolis-Honeywell models No. K903A for proportioning controls, associated directly with the control valve, and No. T915C as the remote bulb device 43, with an adjustable temperature range from 65° to 140° F.

With such a proportioning type of control arranged as indicated, the adjustment should be such that the heat would not be shut off until the temperature at the bulb 43 is considerably above that really desired for the sludge leaving the heat exchanger. Otherwise, with no raw sludge being received, the recirculated sludge would cut off all heat supply and no correction would be made in time to prevent the discharge of considerable under-heated sludge.

With the recirculation provided according to this invention, it is unlikely that there will be much adhesion of particles to the inside of the heat exchanger pipes. It is preferred, however, that a high frequency vibrator be attached to these pipes, perhaps at a mid-point of the total length, to set up vibrations in the walls of the pipes which will act to prevent such adhesion. Apparently the solid particles are bounced away from the walls of the pipe by the vibrations, or repelled therefrom by wave action without contact with the wall. Any frequency found to prevent adhesion may be used. It is believed that this will also give a better rate of heat exchange.

I claim:

1. Apparatus for heating sludge including a heat exchanger having a sludge-heating conduit, jacket means surrounding the sludge-heating conduit, a raw sludge supply conduit and a return supply conduit from a digester, both communicating with the inlet of the sludge-heating conduit and a discharge conduit connecting the outlet of the sludge-heating conduit and said digester, a by-pass conduit connected between the discharge conduit and the raw sludge supply conduit, a sludge-circulating pump connected in said conduits in a position to pump the sludge through the sludge-heating conduit and from the sludge-heating conduit both to said digester and separately through the by-pass conduit, a blending valve having its outlet communicating with the end of the jacket adjacent the outlet of the sludge conduit and having its inlets communicating with a source of heated liquid, and with a by-pass pipe communicating with both the other end of the jacket and the return pipe to said source of heated liquid, a recirculating pump connected to cause the liquid from the jacket to circulate through the source of heated liquid or through the by-pass pipe in accordance with the control by said blending valve, and thermostatic means controlling said blending valve and including a temperature-responsive element situated to be responsive to the temperature of the mixture of raw sludge and sludge from the by-pass conduit which is about to enter the heat exchanger.

2. Apparatus for heating sludge including a heat exchanger having a sludge-heating conduit, jacket means surrounding the sludge-heating conduit, a raw sludge supply conduit and a return supply conduit from a digester, both communicating with the inlet of the sludge-heating conduit and a discharge conduit connecting the outlet of the sludge-heating conduit and said digester, a by-pass conduit connected between the discharge conduit and the raw sludge supply conduit, a sludge-circulating pump connected in said conduits in a position to pump the sludge through the sludge-heating conduit and from the sludge-heating conduit both to said digester and separately through the by-pass conduit, and means for controlling the supply of heat to the jacket thermostatically in response to temperature of the mixture of raw sludge and sludge from the by-pass conduit which is about to enter the heat exchanger.

3. Apparatus for heating sludge including a heat exchanger having a sludge-heating conduit, jacket means surrounding the sludge-heating conduit, a raw sludge supply conduit and a return supply conduit from a digester, both communicating with the inlet of the sludge-heating conduit and a discharge conduit connecting the outlet of the sludge-heating conduit and said digester, and means to control the supply of heat to the jacket thermostatically in joint response to the temperature of the raw sludge and the temperature of the heated sludge from the sludge-heating conduit.

4. Apparatus for heating sludge including a heat exchanger having a sludge-heating conduit, jacket means surrounding the sludge-heating conduit, a raw sludge supply conduit and a return supply conduit from a digester, both communicating with the inlet of the sludge-heating conduit and a discharge conduit connecting the outlet of the sludge-heating conduit and said digester, and means to control the supply of heat to the jacket thermostatically in part at least, in response to the temperature of sludge about to enter the sludge-heating conduit.

5. Apparatus for heating sludge including a heat exchanger having a sludge-heating conduit, jacket means surrounding the sludge-heating conduit, a raw sludge supply conduit and a return supply conduit from a digester, both communicating with the inlet of the sludge-heating conduit and a discharge conduit connecting the outlet of the sludge-heating conduit and said digester, a by-pass conduit connected between the discharge conduit and the raw sludge supply conduit, a sludge-circulating pump connected in said conduits in a position to pump the sludge both to said digester and through the by-pass conduit, a heat supply valve having its outlet communicating with the end of the jacket adjacent the outlet of the sludge conduit and having an inlet communicating with a source of heated liquid, and thermostatic means controlling said heat supply valve and including a temperature-responsive element situated to be responsive to temperature of the mixture of raw sludge and sludge from the by-pass conduit which is about to enter the heat exchanger.

JAMES DONALD WALKER.

REFERENCES CITED

The following references are of record in the file of this patent:

UNITED STATES PATENTS

| Number | Name | Date |
| --- | --- | --- |
| 1,847,589 | Brobeck | Mar. 1, 1932 |
| 2,190,598 | Fischer | Feb. 13, 1940 |
| 2,197,118 | Astle | Apr. 16, 1940 |
| 2,282,013 | Wetzsteon | May 5, 1942 |